US012689033B2

(12) United States Patent
Ishibashi et al.

(10) Patent No.: US 12,689,033 B2
(45) Date of Patent: Jul. 21, 2026

(54) POSITIVE ELECTRODE MATERIAL FOR LITHIUM ION SECONDARY BATTERY AND METHOD OF MANUFACTURING THE POSITIVE ELECTRODE MATERIAL FOR LITHIUM ION SECONDARY BATTERY

(71) Applicant: NICHIA CORPORATION, Anan (JP)

(72) Inventors: Hayato Ishibashi, Anan (JP); Kenichi Kobayashi, Tokushima (JP); Kento Isai, Anan (JP); Kenta Kawai, Tokushima (JP); Koichi Sumiwaka, Anan (JP)

(73) Assignee: NICHIA CORPORATION, Anan (JP)

( * ) Notice: Subject to any disclaimer, the term of this patent is extended or adjusted under 35 U.S.C. 154(b) by 476 days.

(21) Appl. No.: 18/346,429

(22) Filed: Jul. 3, 2023

(65) Prior Publication Data

US 2024/0021814 A1 Jan. 18, 2024

(30) Foreign Application Priority Data

| Jul. 8, 2022 | (JP) | 2022-110477 |
| Dec. 27, 2022 | (JP) | 2022-209267 |
| Apr. 10, 2023 | (JP) | 2023-063291 |

(51) Int. Cl.
| $H01M$ 4/525 | (2010.01) |
| $C01G$ 53/50 | (2025.01) |
| $H01M$ 4/505 | (2010.01) |
| $H01M$ 4/02 | (2006.01) |

(52) U.S. Cl.
CPC ............ $H01M$ 4/525 (2013.01); $C01G$ 53/50 (2013.01); $H01M$ 4/505 (2013.01); $C01P$ 2002/52 (2013.01); $C01P$ 2006/40 (2013.01); $H01M$ 2004/028 (2013.01)

(58) Field of Classification Search
CPC ................. $H01M$ 4/525; $H01M$ 4/505; $H01M$ 2004/028; $C01G$ 53/50; $C01G$ 53/42; $C01P$ 2002/52; $C01P$ 2006/40; $Y02E$ 60/10
See application file for complete search history.

(56) References Cited

U.S. PATENT DOCUMENTS

| 2018/0309124 A1 | 10/2018 | Kanada et al. |
| 2019/0115596 A1* | 4/2019 | Kajiyama ............. $H01M$ 4/525 |
| 2019/0288285 A1 | 9/2019 | Kim et al. |
| 2020/0295365 A1 | 9/2020 | Saitou et al. |

FOREIGN PATENT DOCUMENTS

| JP | 2013114815 A | 6/2013 |
| JP | 2017188428 A | 10/2017 |
| JP | 2019175694 A | 10/2019 |
| JP | 2020011892 A | 1/2020 |
| JP | 2020501310 A | 1/2020 |
| JP | 2020102432 A | 7/2020 |
| JP | 2020123441 A | 8/2020 |
| JP | 2020145189 A | 9/2020 |
| JP | 2021015790 A | 2/2021 |
| JP | 2022033200 A | 2/2022 |
| WO | 2015115088 A1 | 8/2015 |
| WO | 2017061633 A1 | 4/2017 |
| WO | 2017169129 A1 | 10/2017 |
| WO | 2022138104 A1 | 6/2022 |

* cited by examiner

*Primary Examiner* — Mark Kopec
*Assistant Examiner* — Jaison P Thomas
(74) *Attorney, Agent, or Firm* — Hunton Andrews Kurth LLP

(57) ABSTRACT

A method of manufacturing a positive electrode material for a lithium ion secondary battery includes: firing a mixture containing a lithium compound, a nickel-containing complex compound, and a molybdenum compound, to obtain first particles containing a lithium transition metal complex oxide having a composition in which a ratio of a number of moles of nickel to a total number of moles of metals other than lithium is greater than 0.6 and less than 1; and bringing the first particles into contact with a liquid medium in such that a solid content concentration of the first particles is in a range of 20 mass % to 80 mass % to remove a part of molybdenum element contained in the first particles to obtain second particles.

19 Claims, No Drawings

POSITIVE ELECTRODE MATERIAL FOR LITHIUM ION SECONDARY BATTERY AND METHOD OF MANUFACTURING THE POSITIVE ELECTRODE MATERIAL FOR LITHIUM ION SECONDARY BATTERY

CROSS REFERENCE TO RELATED APPLICATIONS

This application claims priority to Japanese Patent Application No. 2022-110477, filed on Jul. 8, 2022, Japanese Patent Application No. 2022-209267, filed on Dec. 27, 2022, and Japanese Patent Application No. 2023-063291, filed on Apr. 10, 2023. The entire disclosures of these applications are hereby incorporated herein by reference.

BACKGROUND

The present invention relates to a positive electrode material for a lithium ion secondary battery and a method of manufacturing the positive electrode material for a lithium ion secondary battery.

Lithium transition metal complex oxides such as lithium cobalt oxide, lithium nickel oxide, and lithium nickel cobalt manganese oxide are used in a method of manufacturing a positive electrode material for a lithium ion secondary battery. A lithium-nickel-based complex oxide having an increased ratio of nickel to decrease the usage of cobalt, which is a scarce resource, has an advantage that a charge-discharge capacity per unit weight is high. However, in the lithium-nickel-based complex oxide having an increased nickel ratio, reduction of nickel is likely to occur, and an output may deteriorate in a low state of charge (low SOC).

Japanese Patent Publication No. JP 2020-501310 describes that a lithium composite transition metal oxide containing tungsten is washed with water to remove tungsten remaining on a surface, thereby achieving good capacity characteristics, life characteristics, resistance characteristics, and high-temperature safety.

Japanese Patent Publication No. JP 2020-123441 A describes that a high discharge capacity retention ratio is achieved by covering at least a part of a surface of a lithium sodium nickel cobalt complex oxide with a lithium ion conductive oxide composed of a compound containing molybdenum and lithium.

SUMMARY

A positive electrode material for a lithium ion secondary battery, in particular, such a positive electrode material having a high nickel ratio that a molar ratio of nickel is greater than 0.6 is required to further improve output characteristics at a low SOC. Thus, it is an object of the present invention to provide a method of manufacturing a positive electrode material having better output characteristics at a low SOC while maintaining a discharge capacity.

A first aspect is a method of manufacturing a positive electrode material for a lithium ion secondary battery. A method of manufacturing a positive electrode material for a lithium ion secondary battery includes: firing a mixture containing a lithium compound, a nickel-containing complex compound, and a molybdenum compound, to obtain first particles containing a lithium transition metal complex oxide having a composition in which a ratio of a number of moles of nickel to a total number of moles of metals other than lithium is greater than 0.6 and less than 1; and bringing the first particles into contact with a liquid medium in such that a solid content concentration of the first particles is in a range of 20 mass % to 80 mass % to remove a part of molybdenum element contained in the first particles to obtain second particles.

A second aspect is a positive electrode material for a lithium ion secondary battery. The positive electrode material for a lithium ion secondary battery includes oxide particles containing an oxide containing lithium, nickel, and molybdenum, the oxide having a composition in which a ratio of a number of moles of nickel to a total number of moles of metals other than lithium is greater than 0.6 and less than 1. When 200 g of the oxide particles and 165 g of pure water are mixed and then stirred for 30 minutes to obtain a slurry and the slurry is subject to filtration to obtain a powder, a ratio of a number of moles of molybdenum to a total number of moles of metals other than lithium contained in the powder after the filtration is 0.55 times or more a ratio of a number of moles of molybdenum to a total number of moles of metals other than lithium in the oxide particles before the filtration.

According to this, it is possible to provide a method of manufacturing a positive electrode material having more good output characteristics at a low SOC while maintaining a discharge capacity.

DETAILED DESCRIPTION

Embodiments of the present invention will be described below in detail. However, the embodiments described below are merely examples of a method of manufacturing a positive electrode material for a lithium ion secondary battery for embodying the technical concept of the present invention, and the method of manufacturing a positive electrode material for a lithium ion secondary battery according to the present invention is not limited thereto. If a plurality of substances applicable to each component in a composition are present, the content of each component in the composition refers to the total amount of the plurality of substances present in the composition, unless otherwise specified. An average particle diameter of particles of a raw material or the like is a central particle diameter of the particles corresponding to a cumulative volume of 50% from a small particle diameter side in a particle size distribution obtained by a laser scattering method.

A method of manufacturing a positive electrode material for a lithium ion secondary battery includes: firing a mixture containing a lithium compound, a nickel-containing complex compound, and a molybdenum compound, to obtain first particles containing a lithium transition metal complex oxide having a composition in which a ratio of a number of moles of nickel to a total number of moles of metals other than lithium is greater than 0.6 and less than 1; and bringing the first particles into contact with a liquid medium in such that a solid content concentration of the first particles is in a range of 20 mass % to 80 mass % to remove a part of molybdenum element contained in the first particles to obtain second particles. In addition, other steps such as a provision step of providing a nickel-containing complex compound may be included, as necessary.

The mixture containing the lithium compound, the nickel-containing complex compound, and the molybdenum compound is fired to obtain the first particles containing such a lithium transition metal complex oxide that the ratio of the number of moles of nickel is greater than 0.6 and less than 1. Thereafter, when the second particles obtained by bringing the first particles into contact with the liquid medium are employed in the lithium ion secondary battery, output characteristics at a low SOC can be further improved while a discharge capacity is maintained. This can be thought, for example, as follows. When the first particles and the liquid medium are brought into contact with each other to obtain the second particles, a part of molybdenum contained in the first particles is removed, so that a part of the molybdenum compound decrease and a specific surface area increases in the obtained second particles. The molybdenum compound tends to be less prone to segregation than tungsten and the like. Thus, when the molybdenum compound is used, a void may be formed by removing the molybdenum compound over the entire region of the particle during washing by contact with the liquid medium. Accordingly, when the obtained second particle is used in a battery, movement of lithium ions can be promoted not only on a surface of the particle but also in the inside of the particle and resistance is improved. In addition to improvement in the output characteristics due to the increase in the specific surface area, the removal of a part of molybdenum can impede the decrease in the discharge capacity, and the residual molybdenum can contribute to the improvement of the output at a low SOC. The improvement of the output characteristics at a low SOC is effective in the first particles containing a lithium transition metal complex oxide having a nickel ratio of greater than 0.6, and it is conceivable that, in the first particles in which the resistance at a low SOC tends to increase, the remaining molybdenum reduces the increase in resistance. Hereinafter, an example of the method of manufacturing a positive electrode material for a lithium ion secondary battery (hereinafter, also simply referred to as a positive electrode material) will be described.

Preparing Step

In the preparing step, a nickel-containing complex compound is provided. The precursor may be provided by selecting an appropriate one from commercially available products, or may be provided by preparing a nickel-containing complex oxide having a desired composition by a known method. Examples of the nickel-containing complex compound include a nickel-containing complex oxide, a nickel-containing composite hydroxide, and a complex oxide or a composite hydroxide containing nickel and a metal other than nickel (for example, cobalt, manganese, aluminum, titanium, niobium, or the like).

Examples of a method of obtaining a nickel-containing complex compound having a desired composition include a method in which raw material compounds (hydroxide, carbonate compound, and the like) are mixed in accordance with a target composition and decomposed into a nickel-containing complex oxide by heat treatment, and a coprecipitation method. In a coprecipitation method, a solution in which a raw material compound is dissolved is provided, a precursor precipitate having a target composition is obtained by temperature adjustment, pH adjustment, introduction of a complexing agent, etc., and the precursor precipitate is heat-treated to obtain the nickel-containing complex oxide as the nickel-containing complex compound. Hereinafter, an example of a method of manufacturing a nickel-containing complex oxide (hereinafter, also simply referred to as a complex oxide) will be described.

The method of obtaining a complex oxide by the coprecipitation method can include a seed generation step of obtaining a seed crystal by adjusting the pH, etc., of a mixed solution containing metal ions at a desired composition ratio, a crystallization step of obtaining a composite hydroxide having desired characteristics by growing the generated seed crystal, and a step of obtaining the complex oxide by heat-treating the obtained composite hydroxide.

In the seed generation step, a liquid medium containing the seed crystal is prepared by adjusting the pH of a mixed solution containing nickel ions at a desired composition ratio to, for example, from 11 to 13. The seed crystal can include, for example, a hydroxide containing nickel in a desired proportion. The mixed solution can be prepared by dissolving a nickel salt in water at a desired ratio. Examples of the nickel salt include sulfate, nitrate, and hydrochloride. The mixed solution may contain, in addition to the nickel salt, another metal salt at a desired composition ratio, if necessary. The temperature in the seed generation step can be, for example, from 40° C. to 80° C. The atmosphere in the seed generation step can be a low oxidizing atmosphere, and for example, the oxygen concentration may be maintained at 10 vol % or less.

In the crystallization step, the generated seed crystal is grown to obtain a precursor precipitate containing nickel having desired characteristics. The growth of the seed crystal can be carried out, for example, by adding a mixed solution containing nickel ions and optionally other metal ions to a liquid medium containing the seed crystal while maintaining the pH in a range of from 7 to 12.5, for example, and preferably in a range from 7.5 to 12. The addition time of the mixed solution is in a range from 1 hour to 24 hours, for example, and preferably from 3 hours to 18 hours. The temperature in the crystallization step can be, for example, from 40° C. to 80° C. The atmosphere in the crystallization step is the same as that in the seed generation step.

The pH in the seed generation step and the crystallization step can be adjusted using an acidic aqueous solution such as a sulfuric acid aqueous solution or a nitric acid aqueous solution, an alkaline aqueous solution such as a sodium hydroxide aqueous solution or ammonia water, or the like.

In the crystallization step, it is desirable to control the particle diameter of the precursor precipitate. The particle diameter of the precursor precipitate can be controlled by adjusting the temperature, pH, stirring speed, and the like of a reaction field. These conditions can be appropriately adjusted in accordance with actual conditions such as the shape of a container housing the reaction field, a starting material, and a rate at which the starting material is charged into the reaction field. In addition, the particle diameter of the precursor precipitate can be controlled by an aging time from the start of precipitation of the precursor precipitate, the stirring speed, and the like. Because the growth rate, shape and the like of particles vary depending on a shape of a reaction vessel, the conditions at this time may be appropriately adjusted in accordance with actual conditions.

In the step of obtaining the complex oxide, the complex oxide is obtained by heat-treating the precursor precipitate containing the composite hydroxide obtained in the crystallization step. The heat treatment may be carried out by heating the composite hydroxide at a temperature of, for example, 500° C. or less, preferably 350° C. or less. The heat treatment temperature may be, for example, 100° C. or higher, and preferably 200° C. or higher. A heat treatment time may be, for example, from 0.5 hours to 48 hours, preferably from 5 hours to 24 hours. An atmosphere of the heat treatment may be an air atmosphere or an atmosphere containing oxygen. The heat treatment may be performed using, for example, a box furnace, a rotary kiln furnace, a pusher furnace, a roller hearth kiln furnace, or the like.

The obtained complex oxide may contain other metal elements in addition to nickel. Examples of the other metal include cobalt, manganese, aluminum, titanium, and niobium, and the other metal is preferably at least one selected from the group consisting of these metals, and preferably contains at least one selected from the group consisting of at least cobalt, manganese, and aluminum. When the complex oxide contains another metal, another metal ion may be contained in a desired composition in a mixed aqueous solution for obtaining the precursor precipitate. Thus, nickel and another metal are contained in the precursor precipitate, and the precursor precipitate is heat-treated, whereby a complex oxide having a desired composition can be obtained.

An average particle diameter of the complex oxide is in a range from 2 μm to 30 μm, for example, and preferably in a range from 3 μm to 25 μm. The average particle diameter of the complex oxide is a volume average particle diameter, and is a value at which a volume integrated value from a small particle diameter side in a volume distribution obtained by a laser scattering method is 50%.

In the nickel-containing complex compound, a ratio of a number of moles of nickel to a total number of moles of metals contained in the nickel-containing complex compound may be, for example, greater than 0.6 and less than 1. The ratio of the number of moles of nickel to the total number of moles of metals contained in the nickel-containing complex compound is preferably 0.7 or greater, and more preferably 0.8 or greater. Furthermore, the ratio of the number of moles of nickel to the total number of moles of metals contained in the nickel-containing complex compound may be 0.98 or less or 0.95 or less. When the nickel ratio in the nickel-containing complex compound is within the above range, the effect of improving the output at a low SOC by the addition or removal of molybdenum to be described later tends to be further increased while increasing the discharge capacity of the positive electrode material obtained by using the nickel-containing complex compound.

In the nickel-containing complex compound, a ratio of a number of moles of cobalt to the total number of moles of metals contained in the nickel-containing complex compound may be 0 or greater and less than 0.4, preferably 0.01 or greater, and more preferably 0.03 or greater. The ratio of the number of moles of cobalt to the total number of moles of metals contained in the nickel-containing complex compound is preferably 0.2 or less, and more preferably 0.1 or less. When the cobalt ratio in the nickel-containing complex compound is within the above range, the cost for manufacturing the positive electrode material can be reduced, and the effect of improving the output at a low SOC by the addition or removal of molybdenum to be described later tends to be further increased.

The nickel-containing complex compound may be a compound containing at least nickel and cobalt. When the nickel-containing complex compound contains cobalt in addition to nickel, the ratio of the number of moles of cobalt to the total number of moles of metals contained in the nickel-containing complex compound may be 0.01 or greater and less than 0.4, preferably 0.02 or greater, more preferably 0.04 or greater, and preferably 0.2 or less, more preferably 0.1 or less.

The nickel-containing complex compound may have a composition containing at least one of manganese or aluminum. When the nickel-containing complex compound has a composition containing at least one of manganese or aluminum, a ratio of a total number of moles of manganese and aluminum to the total number of moles of metals contained in the nickel-containing complex compound is, for example, greater than 0, preferably 0.01 or greater, and more preferably 0.03 or greater. The ratio of the total number of moles of manganese and aluminum to the total number of moles of metals contained in the nickel-containing complex compound may be, for example, less than 0.4, preferably 0.2 or less, and more preferably 0.1 or less. When the ratio of manganese and aluminum in the nickel-containing complex compound is within the above range, the discharge capacity of the positive electrode material obtained using the nickel-containing complex compound tends to be further increased.

The nickel-containing complex compound may have a composition containing a metal element M2 other than nickel, cobalt, manganese, and aluminum. When the nickel-containing complex compound has a composition containing at least the metal element M2, a ratio of a total number of moles of the metal element M2 to the total number of moles of metals contained in the nickel-containing complex compound is, for example, greater than 0, preferably 0.001 or greater, and more preferably 0.003 or greater. The ratio of the total number of moles of the metal element M2 to the total number of moles of metals contained in the nickel-containing complex compound is, for example, 0.1 or less, preferably 0.05 or less, and more preferably 0.03 or less. Examples of the metal element M2 include sodium, potassium, magnesium, calcium, barium, yttrium, titanium, zirconium, niobium, tantalum, chromium, molybdenum, tungsten, iron, copper, zinc, cadmium, gallium, silicon, tin, phosphorus, bismuth, lanthanum, cerium, neodymium, samarium, erbium, and lutetium, and preferably include at least one selected from the group consisting of silicon, zirconium, titanium, magnesium, tantalum, niobium, molybdenum, and tungsten.

The nickel-containing complex compound may be a complex oxide, and may have a composition represented by Formula (2), for example.

$$\mathrm{Ni}_q\mathrm{Co}_r\mathrm{M^1}_s\mathrm{M^2}_t\mathrm{O}_{2+\alpha} \tag{2}$$

In Formula (2), $M^1$ represents at least one of Mn or Al. $M^2$ represents at least one selected from the group consisting of Na, K, Mg, Ca, Ba, Y, Ti, Zr, Nb, Ta, Cr, Mo, W, Fe, Cu, Zn, Cd, Ga, Si, Sn, P, Bi, La, Ce, Nd, Sm, Er, and Lu. q, r, s, t, and a satisfy $0.6<q<1$, $0\leq r<0.4$, $0\leq s<0.4$, $0\leq t\leq 0.1$, $-1\leq\alpha\leq 1$, and $q+r+s+t\leq 1$. Preferably, $0.7\leq q\leq 0.98$, $0.01\leq r\leq 0.2$, $0.01\leq s\leq 0.2$, $0.001\leq t\leq 0.05$, and $-0.1\leq\alpha\leq 0.1$. Also preferably, M2 is at least one selected from the group consisting of Si, Zr, Ti, Mg, Ta, Nb, Mo, and W.

In the step of obtaining the first particles, the mixture containing the lithium compound, the nickel-containing complex compound, and the molybdenum compound is fired to obtain the first particles contain a lithium transition metal complex oxide having a composition in which a ratio of a number of moles of nickel to a total number of moles of metals other than lithium is greater than 0.6 and less than 1. The step of obtaining the first particles may include a mixing step and a firing step in addition to the above-described preparing step.

Mixing Step

The mixing step includes obtaining a mixture containing a lithium compound, a nickel-containing complex compound, and a molybdenum compound. The mixing of the lithium compound, the nickel-containing complex compound and the molybdenum compound may be carried out by a dry method or a wet method. The mixing can be performed using, for example, a super mixer and the like. In this mixing step, a simple substance, an alloy, or a metal compound of another metal element may be mixed in addition to the nickel-containing complex compound and the molybdenum compound. As the nickel-containing complex compound, although it is possible to use the nickel-containing complex compound obtained in the preparing step described above, it is also possible to select and use an appropriate one from commercially available products.

Examples of the lithium compound include lithium hydroxide, lithium carbonate, and lithium oxide. The particle diameter of the lithium compound used for mixing is in a range from 0.1 µm to 100 µm, for example, and preferably in a range from 2 µm to 20 µm as a volume average particle diameter.

The lithium compound may be mixed in such a manner that the molar ratio of lithium to the total number of moles of metals contained in the nickel-containing complex compound is in a range from 0.7 to 1.4, or in a range from 0.95 to 1.2. The nickel-containing complex compound and the lithium compound can be mixed using, for example, a high-speed shearing mixer and the like.

Examples of the molybdenum compound include molybdenum oxide, lithium molybdate, molybdenum chloride, molybdenum fluoride, sodium molybdate, and ammonium molybdate. Among them, molybdenum oxide is preferable, and molybdenum trioxide is more preferable. When molybdenum oxide is used as the molybdenum compound, a positive electrode material having a relatively small amount of impurities is obtained; therefore, when the positive electrode material obtained by using the molybdenum oxide is used in a battery, battery characteristics may be improved.

An addition amount of the molybdenum compound may be, for example, 0.5 mol % or greater with respect to a total number of moles of metals other than lithium contained in the mixture excluding the molybdenum compound. The addition amount of the molybdenum compound is preferably greater than 0.5 mol %, more preferably 0.6 mol % or greater, and still more preferably 1 mol % or greater or 1.2 mol % or greater. The addition amount of the molybdenum compound may be 5 mol % or less, preferably 2 mol % or less, and more preferably 1.8 mol % or less with respect to the total number of moles of metals other than lithium contained in the mixture excluding the molybdenum compound. When the addition amount of the molybdenum compound is less than 0.5 mol %, the resulting effect of improving the output characteristics tends to be insufficient.

On the other hand, when the addition amount is greater than 5 mol %, a charge-discharge capacity and cycle characteristics may be deteriorated.

In the mixing step, a simple substance, an alloy, or a metal compound of another metal element may be mixed in addition to the lithium compound, the nickel-containing complex compound, and the molybdenum compound. Examples of the other metal element include aluminum, silicon, zirconium, titanium, magnesium, tantalum, niobium, molybdenum, and tungsten, and at least one selected from the group consisting of aluminum, silicon, zirconium, titanium, magnesium, tantalum, niobium, molybdenum, and tungsten may be contained. Among them, it is preferable to contain at least one selected from the group consisting of aluminum, zirconium, and tungsten as the other metal element, and each of these metal elements may be contained as a simple substance; however, a plurality of compounds may be contained by containing each metal compound. For example, a compound containing aluminum and a compound containing zirconium may be contained in the mixture. Specific examples of a compound containing aluminum include aluminum oxide, aluminum hydroxide, aluminum carbonate, aluminum chloride, aluminum iodide, aluminum sulfate, and aluminum nitrate. Specific examples of a compound containing zirconium include zirconium oxide, zirconium hydroxide, zirconium fluoride, zirconium chloride, zirconium bromide, zirconium iodide, zirconium sulfide, and zirconium carbonate. Specific examples of a compound containing tungsten include tungsten oxide, lithium tungstate, tungsten fluoride, tungsten chloride, tungsten bromide, and tungsten iodide. When a compound containing aluminum is mixed, a crystal structure becomes stabilized, and thus, safety tends to improve in a battery using the obtained positive electrode material. When a compound containing zirconium is mixed, cycle characteristics is expected to improve in a battery using the obtained positive electrode material. When a compound containing tungsten is mixed, the output characteristics tend to further improve in a battery using the obtained positive electrode material.

In the mixing step, particularly when aluminum is mixed as another metal element in addition to the lithium compound, the nickel-containing complex compound, and the molybdenum compound, an addition amount of aluminum may be greater than 0 mol % and 15 mol % or less in terms of aluminum atom with respect to the nickel-containing complex compound. An addition amount of the compound containing aluminum is preferably greater than 0.5 mol %, more preferably 1 mol % or greater, and still more preferably 1.5 mol % or greater in terms of aluminum atom with respect to the nickel-containing complex compound. Mixing is performed in such a manner that the addition amount of the compound containing aluminum is preferably 12 mol % or less, more preferably 8 mol % or less, and still more preferably 5 mol % or less with respect to the nickel-containing complex compound. The compound containing aluminum used for mixing may be a simple substance or a compound.

In the mixing step, when a metal element other than aluminum is mixed as another metal element in addition to the lithium compound, the nickel-containing complex compound, and the molybdenum compound, an addition amount of the metal element may be greater than 0 mol % and 5 mol % or less with respect to the nickel-containing complex compound in terms of atoms of other metal elements. Although a mixed form of the other metal element may be a simple substance or a compound, the other metal element is mixed in such a manner that the addition amount thereof is preferably 0.01 mol % or greater, more preferably 0.05 mol % or greater, and still more preferably 0.1 mol % or greater with respect to the nickel-containing complex compound in terms of atoms of other metal elements. Mixing is performed in such a manner that an addition amount of the metal-containing compound is preferably 3 mol % or less, more preferably 1 mol % or less, and still more preferably 0.5 mol % or less with respect to the nickel-containing complex compound in terms of atoms of other metal elements.

Firing Step

The mixture containing the lithium compound, the nickel-containing complex compound, and the molybdenum compound is fired to obtain the first particles containing a lithium transition metal complex oxide having a composition in which a ratio of a number of moles of nickel to a total number of moles of metals other than lithium is greater than 0.6 and less than 1. The firing may be performed in an air atmosphere or in an atmosphere containing oxygen.

The firing temperature is in a range from 550° C. to 1000° C., for example, preferably in a range from 700° C. to 1000° C., more preferably in a range from 800° C. to 1000° C., and still more preferably in a range from 850° C. to 950° C. The mixture may be fired by heat treatment at a single temperature, but is preferably fired by heat treatment at a plurality of temperatures from the viewpoint of discharge capacity at high voltage. When firing is performed by heat treatment at a plurality of temperatures, for example, it is desirable that a first temperature be held for a predetermined time, then the temperature be further increased, and a second temperature be held for a predetermined time. The first temperature is in a range from 200° C. to 600° C., for example, preferably in a range from 400° C. to 500° C., and the second temperature is in a range from 600° C. to 950° C., for example, preferably in a range from 850° C. to 950° C. The heat treatment time is, for example, from 0.5 hours to 48 hours, and when heat treatment is performed at a plurality of temperatures, the heat treatment time can be from 0.2 hours to 47 hours.

The first particles may contain a lithium transition metal complex oxide having a layered structure. The lithium transition metal complex oxide contained in the first particles is a compound containing nickel, and may further contain cobalt or manganese. The number of moles of lithium contained in the first particles may be in a range from 0.95 to 1.5, or in a range from 1 to 1.2 with respect to the total number of moles of metals other than lithium. The number of moles of nickel contained in the first particles may be 0.6 or greater and less than 1, or 0.8 or greater and 0.98 or less with respect to the total number of moles of metals other than lithium. When cobalt is further contained, the number of moles of cobalt contained in the metals other than lithium may be in a range from 0.01 to 0.2 or less, or in a range from 0.03 to 0.1 with respect to the total number of moles of metals other than lithium.

In the step of obtaining the first particles, the lithium transition metal complex oxide contained in the first particles may have a composition in which a ratio of the number of moles of molybdenum to the total number of moles of metals other than lithium may be greater than 0.005 and 0.02 or less. The content of molybdenum contained in the first particles is preferably 0.006 or greater, more preferably 0.01 or greater, and still more preferably 0.012 or greater with respect to the total number of moles of metals other than lithium in the composition of the lithium transition metal complex oxide contained in the first particles. The content of molybdenum contained in the first particles is preferably 0.018 or less with respect to the total number of moles of metals other than lithium in the composition of the lithium transition metal complex oxide contained in the first particles. When the content of molybdenum contained in the first particles is 0.005 or less, the effect of improving the output characteristics tends to be insufficient.

The lithium transition metal complex oxide contained in the first particles may be a complex oxide, and may have, for example, a composition represented by Formula (1).

$$Li_pNi_xCo_yM^1_zM^2_uO_{2+\alpha} \qquad (1)$$

In Formula (1), $M^1$ represents at least one of Mn or Al. $M^2$ represents at least one selected from the group consisting of Na, K, Mg, Ca, Ba, Y, Ti, Zr, Nb, Ta, Cr, Mo, W, Fe, Cu, Zn, Cd, Ga, Si, Sn, P, Bi, La, Ce, Nd, Sm, Er, and Lu. p, x, y, z, u, and a satisfy $0.95 \leq p \leq 1.5$, $0.6 < x < 1$, $0 \leq y < 0.4$, $0 \leq z < 0.4$, $0 \leq u \leq 0.1$, $-0.3 \leq \alpha \leq 0.3$, and $x+y+z+u \leq 1$. Preferably, $1.0 \leq p \leq 1.3$, $0.7 \leq x \leq 0.98$, $0.01 \leq y \leq 0.2$, $0.01 \leq z \leq 0.2$, $0.001 \leq u \leq 0.05$, and $-0.1 \leq \alpha \leq 0.1$. Also preferably, $M^2$ is at least one selected from the group consisting of Si, Zr, Ti, Mg, Ta, Nb, Mo, and W, and more preferably $M^2$ contains Mo. In addition to Mo, at least one selected from the group consisting of Si, Zr, Ti, Mg, Ta, Nb, and W may be contained.

The step of obtaining the second particles includes bringing the first particles into contact with the liquid medium such that a solid content concentration of the first particles is in a range of 20 mass % to 80 mass % and thus removing a part of molybdenum element contained in the first particles. In this step, a washing step may be included as the step of bringing the first particles into contact with the liquid medium, and a boron mixing step and a heat treatment step may be included after the washing step. For example, the first particles may be brought into contact with the liquid medium, and then further mixed with a boron compound, and the mixture may be heat-treated.

Washing Step

In the washing step, the first particles are brought into contact with the liquid medium and thus a part of the molybdenum element contained in the first particles is removed, and thereby washed particles are obtained as the second particles. A treated product after being brought into contact with the liquid medium may be subjected to a dehydration treatment, a drying treatment, and the other treatment, as necessary. The washing step is, for example, a step of removing a part of molybdenum element contained in the first particles, and a conceivable example of the form of molybdenum contained in the first particles includes lithium molybdate generated in the firing step and the like.

The liquid medium (hereinafter, the washing liquid) may contain metal ions such as sodium, as necessary. Examples thereof include alkali metal ions such as sodium ions, lithium ions, and potassium ions, and alkaline earth metal ions such as magnesium ions, and a solution containing at least one of sodium or lithium is preferable. When the washing liquid contains sodium ions, the content of sodium ions may be in a range from 0.01 mol/L to 2.0 mol/L, for example, and is preferably in a range from 0.03 mol/L to 1.5 mol/L, more preferably in a range from 0.05 mol/L to 1.0 mol/L, still more preferably in a range from 0.05 mol/L to 0.7 mol/L, and particularly preferably in a range from 0.1 mol/L to 0.4 mol/L. The same applies to a case in which the washing liquid contains lithium ions. When both sodium ions and lithium ions are contained, the total content of each ion is preferably in the above range. When the washing liquid contains metal ions other than sodium, the content thereof may be, for example, 0.1 mol/L or less, and preferably less than 0.01 mol/L. From the viewpoint of reducing damage to the lithium transition metal complex oxide contained in the first particles, sodium is preferably contained in the washing liquid, and the metal ion contained in the washing liquid is preferably in the above range. When the sodium ion content is 0.4 mol %/L or less, damage due to washing can be particularly reduced, and the battery characteristics tend to be further improved.

A contact temperature between the first particles and the washing liquid is in a range from 5° C. to 60° C., for example, and preferably in a range from 10° C. to 40° C. A contact time is in a range from 1 minute to 2 hours, for example, and preferably in a range from 5 minutes to 30 minutes.

The contact between the first particles and the washing liquid may be performed by charging the first particles to the washing liquid to prepare a slurry. The contact between the first particles and the washing liquid may be performed such that the solid content concentration of the first particles is in a range from 20 mass % to 80 mass %, for example, preferably in a range from 25 mass % to 60 mass %, and more preferably in a range from 30 mass % to 60 mass %. The solid content concentration of the first particles is a mass of the first particles/(the mass of the first particles+a mass of the washing liquid), and for example, when the solid content concentration is 20 mass %, the mass ratio of the first particles to the washing liquid is 20:80. In the above range of the solid content concentration, the effect tends to be more easily achieved when the first particles are charged into the washing liquid and brought into contact as a slurry. The contact may be performed by passing the washing liquid through the first particles held on a filter, or by passing the washing liquid through a dehydrated cake obtained by washing the first particles with pure water or the like and dehydrating. When the washing liquid is passed through the dehydrated cake obtained by washing the first particles with pure water or the like and then dehydrating, a total liquid amount of the pure water and the washing liquid to be used is preferably in a range from 0.25 times to 10 times, and more preferably in a range from 0.5 times to 4 times the mass of the first particles.

The contact between the first particles and the washing liquid may be performed in such a manner that a ratio of a number of moles of molybdenum to a total number of moles of metals other than lithium in a composition of the lithium transition metal complex oxide contained in the second particles (hereinafter, molybdenum ratio) has the following relationship with respect to the ratio of the number of moles of molybdenum to the total number of moles of metals other than lithium in the composition of the lithium transition metal complex oxide contained in the first particles. Specifically, the contact may be performed in such a manner that a value calculated by dividing the molybdenum ratio of the second particles by the molybdenum ratio of the first particles is 0.3 or greater, preferably in a range from 0.35 to 0.8, more preferably in a range from 0.4 to 0.7, and still more preferably in a range from 0.4 to 0.6. By bringing the first particles and the liquid medium into contact with each other within this range in the washing step, it is possible to reduce damage to the particles due to washing while the effect of improving the output at a low SOC by removing a part of the molybdenum element is achieved. These molybdenum ratios can be measured by inductively coupled plasma (ICP) emission spectroscopy. In doing so, an inductively coupled plasma atomic emission spectrometer (ICP-AES; manufactured by PerkinElmer Co., Ltd.) may be used.

The washed particles obtained in the washing step may be subjected to a drying treatment. The drying treatment only needs to be able to remove at least a part of moisture adhering to the washed particles, and can be performed by heat drying, air drying, reduced pressure drying, or the like. A drying temperature in the heat drying may be a temperature at which moisture contained in the washed particles is sufficiently removed. The drying temperature is in a range from 80° C. to 300° C., for example, and preferably in a range from 100° C. to 250° C. A drying time may be appropriately selected according to an amount of moisture contained in the washed particles. The drying time is, for example, in a range from 1 hour to 10 hours.

Boron Mixing Step

In a boron mixing step, the washed particles and a boron compound are mixed to obtain a boron mixture. The washed particles and the boron compound may be mixed in a dry manner or in a wet manner. The mixing can be performed using, for example, a super mixer and the like. In the boron mixing step, a simple substance, an alloy, or a metal compound of another metal element may be mixed in addition to the boron compound. Examples of the other metal element include aluminum, silicon, zirconium, titanium, magnesium, tantalum, niobium, molybdenum, and tungsten, and at least one selected from the group consisting of them is preferable.

The boron compound can be selected from at least one selected from the group consisting of boron oxide, oxoacid of boron, and oxoacid salt of boron. More specific examples of the boron compound include lithium tetraborate ($Li_2B_4O_7$), ammonium pentaborate ($NH_4B_5O_8$), orthoboric acid ($H_3BO_3$; so-called ordinary boric acid), lithium metaborate ($LiBO_2$), and boron oxide ($B_2O_3$), at least one selected from the group consisting of them is preferable, and orthoboric acid is more preferable in terms of cost.

The boron compound may be mixed in a solid state with the washed particles, or may be mixed as a solution of the boron compound with the washed particles. When the boron compound in the solid state is used, the volume average particle diameter of the boron compound is in a range from 1 μm to 60 μm, for example, and preferably in a range from 10 μm to 30 μm.

A content of the boron compound in the boron mixture may be in a range from 0.1 mol % to 2 mol %, for example, and is preferably in a range from 0.1 mol % to 1.5 mol %, and more preferably in a range from 0.1 mol % to 1.2 mol % as a ratio of a number of moles of boron atoms to a total number of moles of metals other than lithium in the lithium transition metal complex oxide contained in the washed particles.

Heat Treatment Step

In the heat treatment step, the boron mixture is heat-treated at, for example, a temperature in a range from 100° C. to 450° C. to obtain a heat-treated product as the positive electrode material. The temperature of the heat treatment may be in a range from 200° C. to 400° C., preferably in a range from 220° C. to 350° C., and more preferably in a range from 250° C. to 350° C. An atmosphere of the heat treatment may be an oxygen-containing atmosphere or an air atmosphere. The heat treatment time is in a range from 1 hour to 20 hours, for example, and preferably in a range from 5 hours to 10 hours. The heat-treated product obtained in the heat treatment step may be subjected to a crushing treatment, a classification treatment, or the like, as necessary.

The heat-treated product obtained after the heat treatment has a specific surface area, preferably in a range from 1.0 $m^2/g$ to 2.0 $m^2/g$, and more preferably in a range from 1.3 $m^2/g$ to 1.7 $m^2/g$. A ratio of molybdenum to the lithium transition metal complex oxide is preferably in a range from 0.004 to 0.02, and more preferably in a range from 0.005 to 0.01.

A lithium-deficient region may be formed near a surface of the washed particles after the washing step, and desorption/insertion of lithium ions may be inhibited in the lithium-deficient region. However, it is conceivable that by mixing the boron compound with the washed particles after the washing step and performing heat treatment, lithium deficiency is compensated, inhibition of desorption/insertion of lithium ions is suppressed, and charge/discharge characteristics and cycle characteristics are improved. When the washed particles are subjected to the boron mixing step and the heat treatment step as described above, the battery characteristics of the positive electrode material as the second particles tend to be further improved.

The positive electrode material for a lithium ion secondary battery obtained as described above contains oxide particles (second particles) containing an oxide containing lithium, nickel, and molybdenum, the oxide having a composition in which a ratio of a number of moles of nickel to a total number of moles of metals other than lithium is greater than 0.6 and less than 1. When 200 g of the oxide particles and 165 g of pure water are mixed and then stirred for 30 minutes to obtain a slurry and the slurry is subject to filtration to obtain a powder, a ratio of a number of moles of molybdenum to a total number of moles of metals other than lithium contained in the powder after the filtration is 0.55 times or more a ratio of a number of moles of molybdenum to a total number of moles of metals other than lithium in the oxide particles before the filtration.

In the positive electrode material for a lithium ion secondary battery, when 200 g of the oxide particles and 165 g of pure water are mixed and then stirred for 30 minutes to obtain a slurry and the slurry is subject to filtration to obtain a powder, a residual molybdenum ratio of a ratio of a number of moles of molybdenum to a total number of moles of metals other than lithium contained in the powder after the filtration with respect to a ratio of a number of moles of molybdenum to a total number of moles of metals other than lithium in the oxide particles before the filtration is 0.55 times or more. The residual molybdenum ratio is preferably 0.6 times or more and less than 1. The positive electrode material for a lithium ion secondary battery subjected to the washing step has a relatively high residual molybdenum ratio as compared with the positive electrode material not subjected to the washing step, and thus it is possible to achieve better output characteristics at a low SOC while maintaining the discharge capacity. The residual molybdenum ratio can be measured as follows. An inductively coupled plasma atomic emission spectrometer (ICP-AES; manufactured by PerkinElmer Co., Ltd.) is used for the positive electrode material for a lithium ion secondary battery containing oxide particles, and a ratio (A) of the number of moles of molybdenum to the total number of moles of metals other than lithium is measured. Thereafter, 200 g of the positive electrode material for a lithium ion secondary battery and 165 g of pure water are mixed and then stirred for 30 minutes to prepare a slurry and the slurry is subject to filtration to prepare a powder, and a ratio (B) of the number of moles of molybdenum to the total number of moles of metals other than lithium is determined for the powder after the filtration by using the inductively coupled plasma atomic emission spectrometer in the same or similar manner. Using the respective measurement results, the ratio (B) of the number of moles of molybdenum after the filtration is divided by the ratio (A) of the number of moles of molybdenum before the filtration to calculate a residual molybdenum ratio (B)/(A).

The second particles may contain a lithium transition metal complex oxide having a layered structure. The lithium transition metal complex oxide contained in the second particles is a compound containing nickel, and may further contain cobalt or manganese.

The lithium transition metal complex oxide contained in the second particle may have crystallinity in a range from 300 to 800, preferably in a range from 350 to 700, and more preferably in a range from 400 to 600. When the crystallinity is within the above range, a certain number of grain boundaries are present in the positive electrode material, which may reduce an increase in resistance. The crystallinity is still more preferably in a range from 500 to 550, and when the crystallinity is within this range, the effect of improving the output at a low SOC when molybdenum is added and washed may be particularly large. The crystallinity can be determined by measuring an XRD spectrum of the positive electrode material using a powder X-ray diffractometer and using the half width of a peak in a (104) plane. The crystallinity of a sample can be obtained by, with the use of the least squares method, fitting the XRD pattern of a crystal structure model of a lithium transition metal compound available from the International Diffraction Data Center (ICDD) and the XRD pattern obtained by measurement.

Specifically, the crystallinity can be obtained using the method described in the example below.

An average particle diameter of the second particles is in a range from 2 μm to 30 μm, for example, and preferably in a range from 3 μm to 25 μm. The average particle diameter of the complex oxide is a volume average particle diameter, and is a value at which a volume integrated value from a small particle diameter side in a volume distribution obtained by a laser scattering method is 50%.

The lithium transition metal complex oxide contained in the second particles may have a composition in which a ratio of the number of moles of nickel to a total number of moles of metals other than lithium is greater than 0.6 and less than 1. The ratio of the number of moles of nickel to the total number of moles of metals other than lithium is preferably 0.7 or greater, and more preferably 0.8 or greater. Furthermore, the ratio of the number of moles of nickel to the total number of moles of metals other than lithium may be 0.98 or less or 0.95 or less. When the nickel ratio of the lithium transition metal complex oxide contained in the second particles is within the above range, the effect of improving the output at a low SOC by the addition or removal of molybdenum tends to be further increased while increasing the discharge capacity of the positive electrode material obtained by using the lithium transition metal complex oxide.

The lithium transition metal complex oxide contained in the second particles may have a composition in which a ratio of the number of moles of cobalt to a total number of moles of metals other than lithium is 0 or greater and less than 0.4, and preferably 0.01 or greater, and more preferably 0.03 or greater. The ratio of the number of moles of cobalt to the total number of moles of metals other than lithium is preferably 0.2 or less, and more preferably 0.1 or less. When the ratio of cobalt in the lithium transition metal complex oxide contained in the second particles is within the above range, the cost for manufacturing the positive electrode material can be reduced, and the effect of improving the output at a low SOC by the addition or removal of molybdenum tends to be further increased.

The lithium transition metal complex oxide contained in the second particles may have a composition containing at least one of manganese or aluminum. When the lithium transition metal complex oxide contained in the second particles has a composition containing at least one of manganese or aluminum, a ratio of a total number of moles of manganese and aluminum to a total number of moles of metals other than lithium in the composition of the lithium transition metal complex oxide contained in the second particles is, for example, greater than 0, preferably 0.01 or greater, and more preferably 0.03 or greater. The ratio of the total number of moles of manganese and aluminum to the total number of moles of metals other than lithium may be, for example, less than 0.4, and is preferably 0.2 or less, and more preferably 0.1 or less. When the ratio of manganese and aluminum in the lithium transition metal complex oxide contained in the second particles is within the above range, the discharge capacity of the positive electrode material obtained using the lithium transition metal complex oxide tends to be further increased.

The lithium transition metal complex oxide contained in the second particles may have a composition containing the metal element M2 other than nickel, cobalt, manganese, and aluminum. When the lithium transition metal complex oxide contained in the second particles has a composition containing at least the metal element M2, a ratio of a total number of moles of the metal element M2 to a total number of moles of metals contained in the lithium transition metal complex oxide contained in the second particles is, for example, greater than 0, preferably 0.001 or greater, and more preferably 0.003 or greater. The ratio of the total number of moles of the metal element to the total number of moles of metals contained in the nickel-containing complex compound is, for example, 0.1 or less, preferably 0.05 or less, and more preferably 0.03 or less. Examples of the metal element M2 include sodium, potassium, magnesium, calcium, barium, yttrium, titanium, zirconium, niobium, tantalum, chromium, molybdenum, tungsten, iron, copper, zinc, cadmium, gallium, silicon, tin, phosphorus, bismuth, lanthanum, cerium, neodymium, samarium, erbium, and lutetium, and preferably include at least one selected from the group consisting of silicon, zirconium, titanium, magnesium, tantalum, niobium, molybdenum, and tungsten. More preferably, the metal element M2 includes molybdenum. In addition to molybdenum, at least one selected from the group consisting of silicon, zirconium, titanium, magnesium, tantalum, niobium, and tungsten may be included.

The lithium transition metal complex oxide contained in the second particles may have a composition in which a ratio of a number of moles of molybdenum to a total number of moles of metals other than lithium is in a range from 0.002 to 0.015. The content of molybdenum contained in the second particles is preferably 0.003 or greater, more preferably 0.0035 or greater, still more preferably 0.004 or greater, and particularly preferably 0.0045 or greater with respect to the total number of moles of metals other than lithium in the composition of the lithium transition metal complex oxide contained in the second particles. The content of molybdenum contained in the second particles is preferably 0.013 or less, more preferably 0.01 or less, still more preferably 0.008 or less, and particularly preferably 0.007 or less with respect to the total number of moles of metals other than lithium in the composition of the lithium transition metal complex oxide contained in the second particles. When the content of molybdenum contained in the second particles is within the above range, both the charge-discharge capacity and the output characteristics at a low SOC tend to be easily achieved.

The lithium transition metal complex oxide contained in the second particles may have a composition represented by Formula (1).

$$Li_pNi_xCo_yM^1{}_zM^2{}_uO_{2+\alpha} \qquad (1)$$

In Formula (1), $M^1$ represents at least one of Mn or Al. $M^2$ represents at least one selected from the group consisting of Na, K, Mg, Ca, Ba, Y, Ti, Zr, Nb, Ta, Cr, Mo, W, Fe, Cu, Zn, Cd, Ga, Si, Sn, P, Bi, La, Ce, Nd, Sm, Er, and Lu. p, x, y, z, u, and a satisfy $0.95 \leq p \leq 1.5$, $0.6 < x < 1$, $0 \leq y \leq 0.4$, $0 \leq z \leq 0.4$, $0 \leq u \leq 0.1$, $-0.3 \leq a \leq 0.3$, and $x+y+z+u \leq 1$. Preferably, $1.0 \leq p \leq 1.3$, $0.7 \leq x \leq 0.98$, $0.01 \leq y \leq 0.2$, $0.01 \leq z \leq 0.2$, $0.001 \leq u \leq 0.05$, and $-0.1 \leq a \leq 0.1$. Also preferably, $M^2$ is at least one selected from the group consisting of Si, Zr, Ti, Mg, Ta, Nb, Mo, and W, and more preferably $M^2$ contains Mo. In addition to Mo, at least one selected from the group consisting of Si, Zr, Ti, Mg, Ta, Nb, and W may be contained.

EXAMPLES

The present invention will be described in detail below by using examples, but the present invention is not limited to these examples. As a volume average particle diameter, a value at the volume-cumulative value of 50% in the volume distribution obtained by the laser scattering method was 50% was used. Specifically, a volume average particle diameter was measured using a laser diffraction particle size distribution measuring device (MALVERN Inst. MASTERSIZER 2000). A specific surface area was measured by using a BET specific surface area measuring device (manufactured by Mountech Co., Ltd.: Macsorb) using a gas adsorption method (one-point method) using nitrogen gas. A composition was measured using the inductively coupled plasma atomic emission spectrometer (ICP-AES; manufactured by PerkinElmer Co., Ltd.). The crystallinity was measured as follows.

An X-ray diffraction spectrum (tube current: 200 mA, tube voltage: 45 kV) is measured with a CuKα ray, and a diffraction peak formed in the vicinity of $2\theta=44$ degrees is fitted by a least squares method using a PseudoVoigt function to calculate values of $\theta$ and $\beta$. From the diffraction peak attributed to the (104) plane determined by the X-ray diffraction method, crystallinity D is calculated by Equation (3).

$$D=K'\lambda/((\beta \cos \theta) \qquad (3)$$

In the above equation, D represents crystallinity (angstrom), $\lambda$ represents the wavelength of the X-ray source (when using CuK α ray, 1.54 angstrom), $\beta$ represents integral breadth (radian), $\theta$ represents an angle of diffraction (degree). For K', a value that is measured using a sintered Si for adjusting an optical system (manufactured by Rigaku corporation) and at which the crystallinity D originated from the (022) plane is 1000 angstrom.

Example 1

Preparation Step

Using a coprecipitation method, a nickel-containing complex compound (complex oxide particles) having a volume average particle diameter of 10 μm and a composition of Ni:Co:Mn=0.89:0.05:0.06 was obtained.

Mixing Step

The obtained complex oxide particles, lithium hydroxide, aluminum hydroxide, zirconium oxide, and molybdenum trioxide were mixed. The lithium hydroxide was adjusted in such a manner that Li:(Ni+Co+Mn):Al=1.10:0.98:0.02 was achieved in terms of molar ratio. An addition amount of zirconium oxide was adjusted to 0.3 mol % with respect to the complex oxide particles. An addition amount of molybdenum trioxide was adjusted to be 1.7 mol % with respect to a total amount of aluminum added in addition to nickel, cobalt, and manganese in the complex oxide particles, that is, to be (Ni+Co+Mn+Al):Mo=1:0.017. The complex oxide particles, lithium hydroxide, aluminum hydroxide, zirconium oxide, and molybdenum trioxide were mixed to form a mixture.

Firing Step

The formed mixture was heat-treated in an oxygen stream at a first temperature of 450° C. for 3 hours and at a second temperature of 915° C. for 4 hours. After firing, grinding treatment was performed to obtain first particles containing a lithium transition metal complex oxide having a composition in which a ratio of nickel, cobalt, manganese, and aluminum was Ni:Co:Mn:Al=0.87:0.05:0.06:0.02. An amount of molybdenum with respect to a total number of moles of metals other than lithium contained in the first particles is shown in Table 1. In the following Examples and Comparative Examples, an amount of molybdenum is similarly shown in each table.

Washing Step

The obtained first particles were added to an aqueous sodium sulfate solution prepared to have a sodium ion concentration of 0.156 mol/L as a washing liquid to prepare a slurry having a solid content concentration of 55 mass %. The solid content concentration was determined by a mass of the first particles/(a mass of the first particles+a mass of the washing liquid). The slurry was stirred for 30 minutes, then dehydrated in a funnel, and separated as a cake. The separated cake was dried in the atmosphere at 250° C. for 10 hours to obtain washed particles.

Boron Mixing Step

Orthoboric acid was added in an amount of 1 mol % in terms of boron atoms with respect to the total number of moles of metals other than lithium in the lithium transition metal complex oxide contained in the washed particles obtained, and the resultant mixture was mixed and stirred to obtain a boron mixture.

Heat Treatment Step

The obtained boron mixture was heat-treated in the atmosphere at 300° C. for 10 hours to obtain a positive electrode material as second particles containing a lithium transition metal complex oxide considered to be $Li_{1.04}Ni_{0.863}Co_{0.049}Mn_{0.058}Al_{0.02}Mo_{0.007}Zr_{0.003}O_2$. Table 1 shows an amount of molybdenum with respect to a total number of moles of metals other than lithium contained in the second particles. In the following Examples and Comparative Examples, an amount of molybdenum is similarly shown in each table.

Example 2

A positive electrode material was obtained in the same manner as in Example 1 except that the second temperature in the firing step was 935° C.

Example 3

A positive electrode material was obtained in the same manner as in Example 1 except that lithium hydroxide was adjusted in such a manner that, in the mixing step, Li:(Ni+Co+Mn):Al=1.07:0.98:0.02 was achieved in terms of molar ratio, the addition amount of molybdenum trioxide was adjusted so as to be 1.0 mol % with respect to the complex oxide particles, and the second temperature in the firing step was 900° C.

Example 4

A positive electrode material was obtained in the same manner as in Example 1 except that lithium hydroxide was adjusted in such a manner that, in the mixing step, Li:(Ni+Co+Mn):Al=1.07:0.98:0.02 was achieved in terms of molar ratio, the addition amount of molybdenum trioxide was adjusted so as to be 1.2 mol % with respect to the complex oxide particles, and the second temperature in the firing step was 910° C.

Comparative Example 1

A positive electrode material was obtained in the same manner as in Example 1 except that the steps after the washing step following the firing step was not performed.

Comparative Example 2

A positive electrode material was obtained in the same manner as in Example 1 except that lithium hydroxide was adjusted in such a manner that, in the mixing step, Li:(Ni+Co+Mn):Al=1.06:0.98:0.02 was achieved in terms of molar ratio, the addition amount of molybdenum oxide was adjusted so as to be 0.5 mol % with respect to the complex oxide particles, and the second temperature in the firing step was 845° C.

Comparative Example 3

A positive electrode material containing a lithium transition metal complex oxide considered to be $Li_{1.05}Ni_{0.861}Co_{0.048}Mn_{0.068}Al_{0.02}Zr_{0.003}O_2$ was obtained in the same manner as in Example 1 except that, in the mixing step, lithium hydroxide was adjusted in such a manner that Li:(Ni+Co+Mn):Al=1.05:0.98:0.02 was achieved in terms of molar ratio, manganese oxide was used in place of molybdenum trioxide, an addition amount of manganese oxide was adjusted so as to be 1.0 mol % with respect to the complex oxide particles, and the second temperature in the firing step was 770° C.

Battery Characteristic Evaluation

For the positive electrode materials obtained in Examples 1 to 4 and Comparative Examples 1 to 3, the discharge capacity and the output characteristics at a low SOC were evaluated as follows.

Evaluation of Discharge Capacity

The discharge capacity of the positive electrode material obtained in each of Examples and Comparative Examples was evaluated as follows.

Preparation of Positive Electrode 92 parts by mass of the positive electrode material, 3 parts by mass of acetylene black, and 5 parts by mass of PVDF (polyvinylidene fluoride) were dispersed and dissolved in NMP (N-methyl-2-pyrrolidone) to prepare a positive electrode slurry. The obtained positive electrode slurry was applied to a current collector formed from aluminum foil, dried, then compression-molded by a roll press machine in such a manner that a positive electrode layer had a density of 3.3 g/cm³, and cut in such a manner that the size was 15 cm² to obtain a positive electrode.

Preparation of Negative Electrode 97.5 parts by mass of artificial graphite, 1.5 parts by mass of CMC (carboxymethyl cellulose), and 1.0 part by mass of SBR (styrene butadiene rubber) were dispersed in water to prepare a negative electrode slurry. The obtained negative electrode slurry was applied to a copper foil, dried, and further compression-molded to obtain a negative electrode.

Preparation of Nonaqueous Electrolyte Solution

EC (ethylene carbonate) and EMC (ethyl methyl carbonate) were mixed at a volume ratio of 3:7 to obtain a mixed solvent. Lithium hexafluorophosphate ($LiPF_6$) was dissolved in the resultant mixed solvent at a concentration of 1 mol/L to obtain a nonaqueous electrolyte solution.

Fabrication of Battery for Evaluation

Lead electrodes were attached to the current collectors of the positive electrode and the negative electrode, respectively, and then vacuum drying was performed at 120° C. Then, a separator was disposed between the positive electrode and the negative electrode, and they were housed in a bag-shaped laminate pack. Subsequently, this was vacuum-dried at 60° C. to remove moisture adsorbed to members. Thereafter, a nonaqueous electrolyte solution was injected into the laminate pack under an argon atmosphere, and the laminate pack was sealed to fabricate a battery for evaluation.

Aging

The battery for evaluation was subjected to constant-current constant-voltage charge (cutoff current: 0.005 C) at a charge voltage of 4.2 V and a charge current of 0.1 C (1 C was a current at which discharge was completed in 1 hour) and constant-current discharge at an end-of-discharge voltage of 2.5 V and a discharge current of 0.1 C, so that the nonaqueous electrolyte solution was applied to the positive electrode and the negative electrode.

Measurement of Discharge Capacity

After the aging, constant current constant voltage charge (cutoff current 0.005 C) was performed at a charge voltage of 4.2 V and a charge current of 0.1 C, and then constant current discharge was performed at an end-of-discharge voltage of 2.5 V and a discharge current of 0.1 C to measure the discharge capacity. The relative discharge capacity in each of Examples and Comparative Examples when the value of the discharge capacity in Comparative Example 3 is 1 is shown in Table 1.

Evaluation of Relative Resistance at Low SOC

For the positive electrode material obtained in each of Examples and Comparative Examples described above, DC-IR (direct current internal resistance) was measured to evaluate the output characteristics at a low SOC. The measurement was performed as follows.

DC-IR Measurement at Low SOC

A battery for evaluation was fabricated in the same manner as in the measurement of the discharge capacity, and aging was performed in the same manner using the fabricated battery for evaluation. The battery for evaluation after aging was placed in an environment of 25° C., and the direct current internal resistance (DC-IR) was measured. Constant current charge was performed up to SOC 95% at a full-charge voltage of 4.2 V, and then an open circuit voltage at SOC 95% was measured. Thereafter, pulse discharge with a specific current i was performed for 30 seconds, and a voltage V after 30 seconds was measured. The direct current internal resistance was calculated from a difference between the open circuit voltage and the voltage V after 30 seconds. The current i was 0.08 A. This was discharged at a constant current to SOC of 80%, 50%, and 5%, respectively, and DC-IR measurement was repeated at each SOC. Table 1 shows the results of the relative resistances of Examples and Comparative Examples when the resistance value of Comparative Example 3 in each of SOC of 80%, 50%, and 5% is 1.

As shown in Table 1, in Examples 1 to 4 in which a molybdenum compound was added, the resistance at a low SOC was reduced, that is, the output characteristics at a low SOC were good, as compared with Comparative Example 3 in which manganese oxide was added. In Comparative Example 1 in which the molybdenum compound was added and washing was not performed, the decrease in discharge capacity was confirmed. In Examples 1 to 4 in which the molybdenum compound was added and washing was performed, when the first particles and the second particles were compared, an increase in specific surface area and a decrease in the content (added metal content ratio) of molybdenum were confirmed. This was considered to be because the molybdenum compound generated during the firing step, for example, what was considered to be lithium molybdate, was removed in the washing step.

Evaluation of Residual Molybdenum Ratio

A residual molybdenum ratio of molybdenum remaining after bringing the obtained positive electrode material into contact with pure water was measured. For the positive electrode material obtained by using the method in Example 1, the ratio (A) of a number of moles of molybdenum to a total number of moles of metals other than lithium was measured using the inductively coupled plasma atomic emission spectrometer (ICP-AES; manufactured by Perki-nElmer Co., Ltd.). Similarly, 200 g of the positive electrode material obtained by the method of Example 1 and 165 g of pure water were mixed, and then stirred for 30 minutes to prepare a slurry. The slurry was subject to filtration to obtaine a powder, and the ratio (B) of a number of moles of molybdenum to a total number of moles of metals other than lithium was determined for the powder after the filtration by using the inductively coupled plasma atomic emission spectrometer in the same manner. Using the respective measurement results, the ratio (B) of the number of moles of molybdenum after the filtration was divided by the ratio (A) of the number of moles of molybdenum before the filtration to calculate the residual molybdenum ratio (B)/(A). The measurement was similarly performed for Comparative Example 1, and the results is shown in Table 2.

TABLE 2

| | Residual Mo ratio |
|---|---|
| Example 1 | 0.620 |
| Comparative Example 1 | 0.544 |

TABLE 1

| | Production condition | | | | | First particle | Second particle | | | | | | | Mo ratio |
|---|---|---|---|---|---|---|---|---|---|---|---|---|---|---|
| | Composition | | Addition | Firing tem- | | Added metal | Added metal | | Specific surface | Relative | Relative resistance | | | (second particle/ |
| | ratio Ni/Co/Mn | Added metal | amount (mol %) | perature (° C.) | Washing | content ratio | content ratio | Crystallinity | area (m²/g) | discharge capacity | SOC 80% | SOC 50% | SOC 5% | first particle) |
| Example 1 | 89/5/6 | Mo | 1.7 | 915 | Washed | 0.0165 | 0.0065 | 470 | 1.30 | 1.02 | 1.01 | 1.01 | 0.69 | 0.39 |
| Example 2 | | | | 935 | | 0.0162 | 0.0065 | 521 | 1.62 | 1.03 | 0.93 | 0.94 | 0.41 | 0.40 |
| Example 3 | | | 1.0 | 900 | | 0.0097 | 0.0050 | 472 | 1.58 | 1.03 | 0.98 | 0.98 | 0.70 | 0.51 |
| Example 4 | | | 1.2 | 910 | | 0.0111 | 0.0053 | 471 | 1.42 | 1.02 | 1.02 | 1.02 | 0.71 | 0.48 |
| Comparative Example 1 | | | 1.7 | 915 | Unwashed | 0.0165 | 0.0164 | 482 | 0.66 | 0.93 | 1.01 | 0.99 | 0.68 | 1.00 |
| Comparative Example 2 | | | 0.5 | 845 | Washed | 0.0049 | 0.0031 | 470 | 1.00 | 1.02 | 0.99 | 1.00 | 1.01 | 0.63 |
| Comparative Example 3 | | Mn | 1.0 | 770 | | — | — | 467 | 0.45 | 1.00 | 1.00 | 1.00 | 1.00 | — |

Example 5

A positive electrode material was obtained in the same manner as in Example 1 except that, in the preparation step, complex oxide particles having a volume average particle diameter of 10 μm and a composition of Ni:Co:Mn=0.88:0.05:0.07 were prepared by the coprecipitation method, in the mixing step, lithium hydroxide was adjusted in such a manner that Li:(Ni+Co+Mn):Al=1.05:0.98:0.02 was achieved in terms of molar ratio, and in the firing step, the heat treatment at the second temperature was performed at 935° C. for 4 hours.

Comparative Example 4

A positive electrode material was obtained in the same manner as in Example 5 except that in the mixing step, lithium hydroxide was adjusted in such a manner that Li:(Ni+Co+Mn):Al=1.07:0.98:0.02 was achieved in terms of molar ratio, molybdenum trioxide was not added, tungsten oxide was used, the addition amount of tungsten oxide was adjusted so as to be 1.7 mol % with respect to the complex oxide, and the second temperature in the firing step was 975° C. Table 3 shows the relative resistance and the relative discharge capacity of each of SOC of 80%, 50%, and 5% in Example 5 and Comparative Example 4 when the resistance value of Comparative Example 4 is taken as 1 and the value of the discharge capacity of Comparative Example 4 is taken as 1 in each of SOC of 80%, 50%, and 5%.

Example 6

In the preparing step, complex oxide particles having a volume average particle diameter of 4 μm and a composition of Ni:Co:Mn=0.88:0.05:0.07 were provided by the coprecipitation method. A positive electrode material was obtained in the same manner as in Example 1 except that in the mixing step, lithium hydroxide was adjusted in such a manner that Li:(Ni+Co+Mn):Al=1.07:0.98:0.02 was achieved in terms of molar ratio, zirconium oxide was not added, the addition amount of molybdenum trioxide was adjusted so as to be 1.0 mol % with respect to the total of nickel, cobalt, manganese, and aluminum, and the second temperature in the firing step was 890° C.

Comparative Example 5

A positive electrode material was obtained in the same manner as in Example 6 except that, in the mixing step, lithium hydroxide was adjusted such that Li:(Ni+Co+Mn):Al=1.05:0.98:0.02 in terms of molar ratio, and in the firing step, the heat treatment at the second temperature was performed at 760° C. for 4 hours. Table 4 shows the relative resistance and the relative discharge capacity of each of SOC of 80%, 50%, and 5% in Example 6 and Comparative Example 5 when the resistance value is taken as 1 and the value of the discharge capacity is taken as 1 in each of SOC of 80%, 50%, and 5% of Comparative Example 5.

Example 7

A positive electrode material was obtained in the same manner as in Example 6 except that, in the preparing step, complex oxide particles having a volume average particle diameter of 22 μm were provided, and the second temperature in the firing step was 910° C.

Comparative Example 6

A positive electrode material was obtained in the same manner as in Comparative Example 5 except that, in the preparing step, complex oxide particles having a volume average particle diameter of 22 μm were provided. Table 5

TABLE 3

| | Production condition | | | | | First particle | Second particle | | | Relative discharge | Relative resistance | | |
| | Composition | Added | Addition amount | Firing temperature | | Added metal content | Added metal content | | Specific surface area | | | | |
| | ratio Ni/Co/Mn | metal | (mol %) | (° C.) | Washing | ratio | ratio | Crystallinity | (m²/g) | discharge capacity | SOC 80% | SOC 50% | SOC 5% |
|---|---|---|---|---|---|---|---|---|---|---|---|---|---|
| Example 5 | 88/5/7 | Mo | 1.7 | 935 | Washed | 0.0153 | 0.0067 | 454 | 1.67 | 1.05 | 0.99 | 0.99 | 0.83 |
| Comparative Example 4 | | W | 1.7 | 975 | | 0.0160 | 0.0060 | 414 | 0.84 | 1.00 | 1.00 | 1.00 | 1.00 |

As shown in Table 3, it was confirmed that in Example 5 in which molybdenum was added and washing was performed, the output characteristics at a low SOC were improved as compared with Comparative Example 4 in which a tungsten compound was added instead of molybdenum.

shows the relative resistance and the relative discharge capacity of each of SOC of 80%, 50%, and 5% in Example 7 and Comparative Example 6 when the resistance value is taken as 1 and the value of the discharge capacity is taken as 1 in each of SOC of 80%, 50%, and 5% of Comparative Example 6.

TABLE 4

| | Production condition | | | | First particle Added metal | Second particle | | | | Relative resistance | | |
|---|---|---|---|---|---|---|---|---|---|---|---|---|
| | Composition ratio Ni/Co/Mn | Added metal | Addition amount (mol %) | Firing temperature (° C.) | Washing | content ratio | Added metal content ratio | Crystallinity | Specific surface area (m²/g) | Relative discharge capacity | SOC 80% | SOC 50% | SOC 5% |
| Example 6 | 88/5/7 | Mo | 1 | 890 | Washed | 0.0094 | 0.0052 | 459 | 1.69 | 1.02 | 0.94 | 0.95 | 0.76 |
| Comparative Example 5 | | — | | 760 | | — | — | 480 | 0.76 | 1.00 | 1.00 | 1.00 | 1.00 |

TABLE 5

| | Production condition | | | | First particle Added metal | Second particle | | | | Relative resistance | | |
|---|---|---|---|---|---|---|---|---|---|---|---|---|
| | Composition ratio Ni/Co/Mn | Added metal | Addition amount (mol %) | Firing temperature (° C.) | Washing | content ratio | Added metal content ratio | Crystallinity | Specific surface area (m²/g) | Relative discharge capacity | SOC 80% | SOC 50% | SOC 5% |
| Example 7 | 88/5/7 | Mo | 1.0 | 760 | Washed | 0.0098 | 0.0057 | 455 | 1.36 | 1.07 | 0.95 | 0.95 | 0.71 |
| Comparative Example 6 | | — | — | 910 | | — | — | 453 | 0.59 | 1.00 | 1.00 | 1.00 | 1.00 |

As shown in Tables 4 and 5, also in Example 6 using the positive electrode material having the average particle diameter of 4 µm and Example 7 using the positive electrode material having the average particle diameter of 22 µm, the improvement of the output characteristics at a low SOC was confirmed by adding molybdenum and washing.

Comparative Example 7

In the preparing step, complex oxide particles having a volume average particle diameter of 10 µm and a composition of Ni:Co:Mn=0.6:0.2:0.2 were provided by the coprecipitation method. In the mixing step, lithium hydroxide was adjusted in such a manner that Li:(Ni+Co+Mn)=1.10:1.0 in terms of molar ratio, aluminum hydroxide and zirconium oxide were not added, and the addition amount of molybdenum trioxide was adjusted so as to be 1.0 mol %, thereby obtaining a mixture. A first particle was obtained in the same manner as in Example 1 except that the heat treatment at the second temperature was performed at 905° C. for 4 hours in the firing step.

A positive electrode material was obtained in the same manner as in Example 1 except that, in the boron mixing step, with respect to the total number of moles of metals other than lithium in the lithium transition metal complex oxide contained in the second particles, orthoboric acid in an amount of 0.5 mol % as a boron element and tungsten oxide in an amount of 0.25 mol % as a tungsten element were added, and in the heat treatment step, the heat treatment temperature was 400° C.

Comparative Example 8

A positive electrode material was obtained in the same manner as in Comparative Example 7 except that, in the mixing step, lithium hydroxide was adjusted in such a manner that Li:(Ni+Co+Mn):Al=1.09:1.0 was achieved in terms of molar ratio, molybdenum trioxide was not added, and the second temperature in the firing step was 845° C.

Comparative Example 9

A positive electrode material was obtained in the same manner as in Comparative Example 7 except that the washing step was not performed.

Comparative Example 10

A positive electrode material was obtained in the same manner as in Comparative Example 8 except that the washing step was not performed. Table 6 shows the relative resistance and the relative discharge capacity of each of SOC of 80%, 50%, and 5% in each Comparative Example when the resistance value is taken as 1 and the value of the discharge capacity is taken as 1 in each of SOC of 80%, 50%, and 5% of Comparative Example 10.

TABLE 6

| | Production condition | | | | | First particle | Second particle | | | | | | |
| | Composition ratio Ni/Co/Mn | Added metal | Addition amount (mol %) | Firing temperature (° C.) | Washing | Added metal content ratio | Added metal content ratio | Crystallinity | Specific surface area (m²/g) | Relative discharge capacity | Relative resistance SOC 80% | SOC 50% | SOC 5% |
|---|---|---|---|---|---|---|---|---|---|---|---|---|---|
| Comparative Example 7 | 6/2/2 | Mo | 1.0 | 905 | Washed | 0.0097 | 0.0064 | 458 | 0.80 | 1.04 | 0.99 | 1.00 | 1.37 |
| Comparative Example 8 | | — | — | 845 | | — | — | 453 | 0.64 | 1.01 | 0.97 | 0.96 | 1.09 |
| Comparative Example 9 | | Mo | 1.0 | 905 | Unwashed | 0.0097 | — | 472 | 0.22 | 0.97 | 0.95 | 0.93 | 1.30 |
| Comparative Example 10 | | — | — | 845 | | — | — | 488 | 0.26 | 1.00 | 1.00 | 1.00 | 1.00 |

As shown in Table 6, as for Comparative Example 10 in which the ratio of Ni:Co:Mn was 6:2:2 and the content of nickel with respect to the metal excluding lithium was 0.6 or less, in Comparative Example 9 in which a molybdenum compound was added, improvement in output characteristics at a low SOC was not observed, and conversely, the output characteristics were deteriorated. Also in Comparative Example 7 in which a molybdenum compound was added and water washing was performed, the output at a low SOC was not improved.

Example 8

A positive electrode material was obtained in the same manner as in Example 2 except that the firing condition in the firing step was an air atmosphere.

Comparative Example 11

A positive electrode material was obtained in the same manner as in Example 8 except that a slurry having a solid content concentration of 10 mass % was prepared in the washing step. Table 7 shows the relative resistance and the relative discharge capacity of each of SOC of 80%, 50%, and 5% in Example 8 and Comparative Examples 11 and 1 when the resistance value is taken as 1 and the value of the discharge capacity is taken as 1 in each of SOC of 80%, 50%, and 5% of Comparative Example 1.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreci-

TABLE 7

| | Production condition | | | | | First particle | Second particle | | | | | | | Mo ratio |
| | Composition ratio Ni/Co/Mn | Added metal | Addition amount (mol %) | Firing temperature (° C.) | Solid content concentration during washing | Added metal content ratio | Added metal content ratio | Crystallinity | Specific surface area (m²/g) | Relative discharge capacity | Relative resistance SOC 80% | SOC 50% | SOC 5% | (second particle/first particle) |
|---|---|---|---|---|---|---|---|---|---|---|---|---|---|---|
| Example 8 | 1989/5/6 | Mo | 1.7 | 935 | 55 | 0.0164 | 0.0086 | 469 | 2.06 | 1.09 | 1.00 | 1.02 | 0.84 | 0.53 |
| Comparative Example 11 | | | | | 10 | 0.0162 | 0.0046 | 471 | 3.58 | 0.99 | 1.49 | 1.55 | 1.26 | 0.28 |
| Comparative Example 1 | | | | 915 | — | 0.0165 | 0.0164 | 482 | 0.66 | 1.00 | 1.00 | 1.00 | 1.00 | 1.00 |

As shown in Table 7, it has been confirmed that both the discharge capacity and the output characteristics at a low SOC can be achieved by performing the washing step under the condition that the solid content concentration is 20 mass % or greater.

ated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of manufacturing a positive electrode material for a lithium ion secondary battery comprising:
   firing a mixture containing a lithium compound, a nickel-containing complex compound, and a molybdenum compound, to obtain first particles containing a lithium transition metal complex oxide having a composition in which a ratio of a number of moles of nickel to a total number of moles of metals other than lithium is greater than 0.6 and less than 1; and
   bringing the first particles into contact with a liquid medium in such that a solid content concentration of the first particles is in a range of 20 mass % to 80 mass % to remove a part of molybdenum element contained in the first particles to obtain second particles,
   wherein the lithium transition metal complex oxide contained in the second particles has a composition in which a ratio of a number of moles of molybdenum to a total number of moles of metals other than lithium is in a range from 0.004 to 0.015.

2. The method of manufacturing a positive electrode material for a lithium ion secondary battery according to claim 1, wherein the lithium transition metal complex oxide contained in the second particles has the composition in which a ratio of a number of moles of nickel to a total number of moles of metals other than lithium is 0.7 or greater and less than 1.

3. The method of manufacturing a positive electrode material for a lithium ion secondary battery according to claim 1, wherein the lithium transition metal complex oxide contained in the second particles has the composition in which a ratio of a number of moles of nickel to a total number of moles of metals other than lithium is 0.8 or greater and less than 0.95.

4. The method of manufacturing a positive electrode material for a lithium ion secondary battery according to claim 1, wherein the lithium transition metal complex oxide contained in the second particles is represented by Composition Formula (1):

$$Li_pNi_xCo_yM^1_zM^2_uO_{2+\alpha} \qquad (1)$$

where $0.95 \leq p \leq 1.5$, $0.6 < x < 1$, $0 \leq y < 0.4$, $0 \leq z < 0.4$, $0 \leq u \leq 0.1$, $-0.3 \leq \alpha \leq 0.3$, and $x+y+z+u \leq 1$, and $M^1$ represents at least one of Mn or Al; and $M^2$ represents at least one selected from the group consisting of Na, K, Mg, Ca, Ba, Y, Ti, Zr, Nb, Ta, Cr, Mo, W, Fe, Cu, Zn, Cd, Ga, Si, Sn, P, Bi, La, Ce, Nd, Sm, Er, and Lu.

5. The method of manufacturing a positive electrode material for a lithium ion secondary battery according to claim 1, wherein, in the step of obtaining the first particles, the lithium transition metal complex oxide contained in the first particles has the composition in which a ratio of a number of moles of molybdenum to the total number of moles of metals other than lithium is greater than 0.005 and 0.02 or less.

6. The method of manufacturing a positive electrode material for a lithium ion secondary battery according to claim 1, wherein, in the step of obtaining the first particles, the mixture is fired at a temperature in a range from 800° C. to 1000° C.

7. The method of manufacturing a positive electrode material for a lithium ion secondary battery according to claim 1, wherein, in the step of obtaining the second particles, the first particles are brought into contact with the liquid medium, then further are mixed with a boron compound, and are subject to a heat treatment.

8. The method of manufacturing a positive electrode material for a lithium ion secondary battery according to claim 1, wherein the nickel-containing complex compound is a complex oxide containing at least nickel and cobalt.

9. The method of manufacturing a positive electrode material for a lithium ion secondary battery according to claim 1, wherein the liquid medium is a solution containing at least one of sodium or lithium.

10. The method of manufacturing a positive electrode material for a lithium ion secondary battery according to claim 1, wherein a ratio of a number of moles of molybdenum to the total number of moles of metals other than lithium in the composition of the lithium transition metal complex oxide contained in the second particles is in a range from 0.35 to 0.8 with respect to a ratio of a number of moles of molybdenum to the total number of moles of metals other than lithium in the composition of the lithium transition metal complex oxide contained in the first particles.

11. A method of manufacturing a positive electrode material for a lithium ion secondary battery comprising:
   firing a mixture containing a lithium compound, a nickel-containing complex compound, and a molybdenum compound, to obtain first particles containing a lithium transition metal complex oxide having a composition in which a ratio of a number of moles of nickel to a total number of moles of metals other than lithium is greater than 0.6 and less than 1; and
   bringing the first particles into contact with a liquid medium in such that a solid content concentration of the first particles is in a range of 20 mass % to 80 mass % to remove a part of molybdenum element contained in the first particles to obtain second particles,
   wherein a ratio of a number of moles of molybdenum to the total number of moles of metals other than lithium in a composition of the lithium transition metal complex oxide contained in the second particles is in a range from 0.35 to 0.8 with respect to a ratio of a number of moles of molybdenum to the total number of moles of metals other than lithium in the composition of the lithium transition metal complex oxide contained in the first particles.

12. The method of manufacturing a positive electrode material for a lithium ion secondary battery according to claim 11, wherein the lithium transition metal complex oxide contained in the second particles has the composition in which a ratio of a number of moles of nickel to the total number of moles of metals other than lithium is 0.7 or greater and less than 1.

13. The method of manufacturing a positive electrode material for a lithium ion secondary battery according to claim 11, wherein the lithium transition metal complex oxide contained in the second particles has the composition in which a ratio of a number of moles of nickel to the total number of moles of metals other than lithium is 0.8 or greater and less than 0.95.

14. The method of manufacturing a positive electrode material for a lithium ion secondary battery according to claim 11, wherein the lithium transition metal complex oxide contained in the second particles is represented by Composition Formula (1):

$$Li_pNi_xCo_yM^1_zM^2_uO_{2+\alpha} \tag{1}$$

where $0.95 \leq p \leq 1.5$, $0.6 < x < 1$, $0 \leq y < 0.4$, $0 \leq z << 0.4$, $0 \leq u \leq 0.1$, $-0.3 \leq \alpha \leq 0.3$, and $x+y+z+u \leq 1$, and $M^1$ represents at least one of Mn or Al; and $M^2$ represents at least one selected from the group consisting of Na, K, Mg, Ca, Ba, Y, Ti, Zr, Nb, Ta, Cr, Mo, W, Fe, Cu, Zn, Cd, Ga, Si, Sn, P, Bi, La, Ce, Nd, Sm, Er, and Lu.

15. The method of manufacturing a positive electrode material for a lithium ion secondary battery according to claim 11, wherein, in the step of obtaining the first particles, the lithium transition metal complex oxide contained in the first particles has the composition in which the ratio of the number of moles of molybdenum to the total number of moles of metals other than lithium is greater than 0.005 and 0.02 or less.

16. The method of manufacturing a positive electrode material for a lithium ion secondary battery according to claim 11, wherein, in the step of obtaining the first particles, the mixture is fired at a temperature in a range from 800° C. to 1000° C.

17. The method of manufacturing a positive electrode material for a lithium ion secondary battery according to claim 11, wherein, in the step of obtaining the second particles, the first particles are brought into contact with the liquid medium, then further are mixed with a boron compound, and are subject to a heat treatment.

18. The method of manufacturing a positive electrode material for a lithium ion secondary battery according to claim 11, wherein the nickel-containing complex compound is a complex oxide containing at least nickel and cobalt.

19. The method of manufacturing a positive electrode material for a lithium ion secondary battery according to claim 11, wherein the liquid medium is a solution containing at least one of sodium or lithium.

* * * * *